US012100104B2

(12) United States Patent
Sharma et al.

(10) Patent No.: US 12,100,104 B2
(45) Date of Patent: Sep. 24, 2024

(54) SYSTEM AND METHOD FOR AUTOMATICALLY RECONSTRUCTING 3D MODEL OF AN OBJECT USING MACHINE LEARNING MODEL

(71) Applicant: INTERNATIONAL INSTITUTE OF INFORMATION TECHNOLOGY, HYDERABAD, Hyderabad (IN)

(72) Inventors: Avinash Sharma, Hyderabad (IN); Narayanan P J, Hyderabad (IN); Sagar Sai Jinka, Hyderabad (IN); Teja Sai Dhondu, Hyderabad (IN); Rohan Chacko, Hyderabad (IN)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 372 days.

(21) Appl. No.: 17/528,218

(22) Filed: Nov. 17, 2021

(65) Prior Publication Data

US 2022/0157016 A1    May 19, 2022

(30) Foreign Application Priority Data

Nov. 17, 2020    (IN) .............................. 202041050006

(51) Int. Cl.
*G06T 17/10*    (2006.01)
*G06T 7/50*    (2017.01)
(Continued)

(52) U.S. Cl.
CPC ................ *G06T 17/10* (2013.01); *G06T 7/50* (2017.01); *G06T 7/90* (2017.01); *G06T 15/04* (2013.01);
(Continued)

(58) Field of Classification Search
CPC ........... G06T 17/10; G06T 17/00; G06T 7/50; G06T 7/90; G06T 15/04; G06T 15/06;
(Continued)

(56) References Cited

U.S. PATENT DOCUMENTS 11,200,689 B1 * 12/2021 Smith ..................... G06T 17/00
2003/0086603 A1 * 5/2003 Davidson .................. G06T 3/40
382/154

(Continued)

FOREIGN PATENT DOCUMENTS

| CN | 111724414 A | * | 9/2020 | |
| JP | 7403528 B2 | * | 12/2023 | ........... G06T 15/205 |
| KR | 20210058320 A | * | 5/2021 | |

OTHER PUBLICATIONS

Kripasindhu Sarkar, Neural Re-Rendering of Humans from a Single Image, Jan. 11, 2021, p. 1-8 (Year: 2021).*

(Continued)

*Primary Examiner* — Ian L Lemieux
*Assistant Examiner* — Sebastian-Sy Vuchi Ngo

(57) ABSTRACT

A system and method of automatically reconstructing a three-dimensional (3D) model of an object using a machine learning model is provided. The method includes (i) obtaining, using an image capturing device, a color image of an object, (ii) generating, using an encoder, a feature map by converting the color image that is represented in the 3D array to n-dimensional array, (iii) generating, using the machine learning model, a set of peeled depth maps and a set of RGB maps from the feature map, (iv) determining one or more 3D surface points of the object by back projecting the set of peeled depth maps and the set of RGB maps to 3D space, (v) reconstructing, using the machine learning model, a 3D model of the object by performing surface reconstruction using the one or more 3D surface points of the object.

18 Claims, 8 Drawing Sheets

(51) Int. Cl.
  *G06T 7/90* (2017.01)
  *G06T 15/04* (2011.01)
  *G06T 15/06* (2011.01)
  *G06T 15/20* (2011.01)
(52) U.S. Cl.
  CPC .............. *G06T 15/06* (2013.01); *G06T 15/20* (2013.01); *G06T 2207/20081* (2013.01); *G06T 2207/20084* (2013.01)
(58) Field of Classification Search
  CPC ........... G06T 15/20; G06T 2207/20081; G06T 2207/20084; G06T 2207/10024; G06T 2207/30196
  See application file for complete search history.

(56) References Cited

U.S. PATENT DOCUMENTS

2019/0213778 A1* 7/2019 Du .................. G06T 15/04
2023/0044644 A1* 2/2023 Elbaz ............... G06T 15/04

OTHER PUBLICATIONS

Sai Sagar Jinka, PeeledHuman: Robust Shape Representation for Textured 3D Human Body Reconstruction, Nov. 2, 2020, p. 1-8 (Year: 2020).*

* cited by examiner

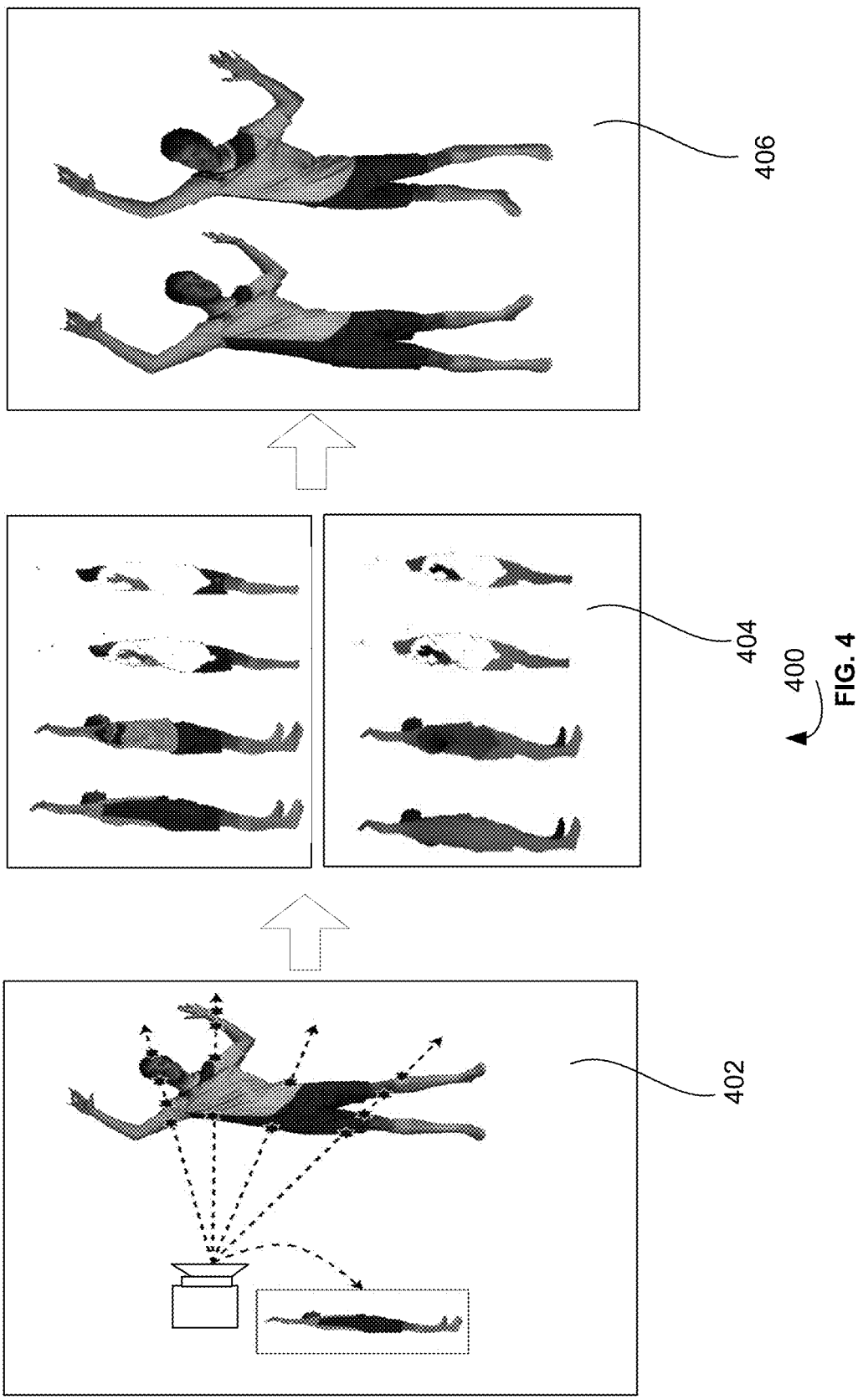

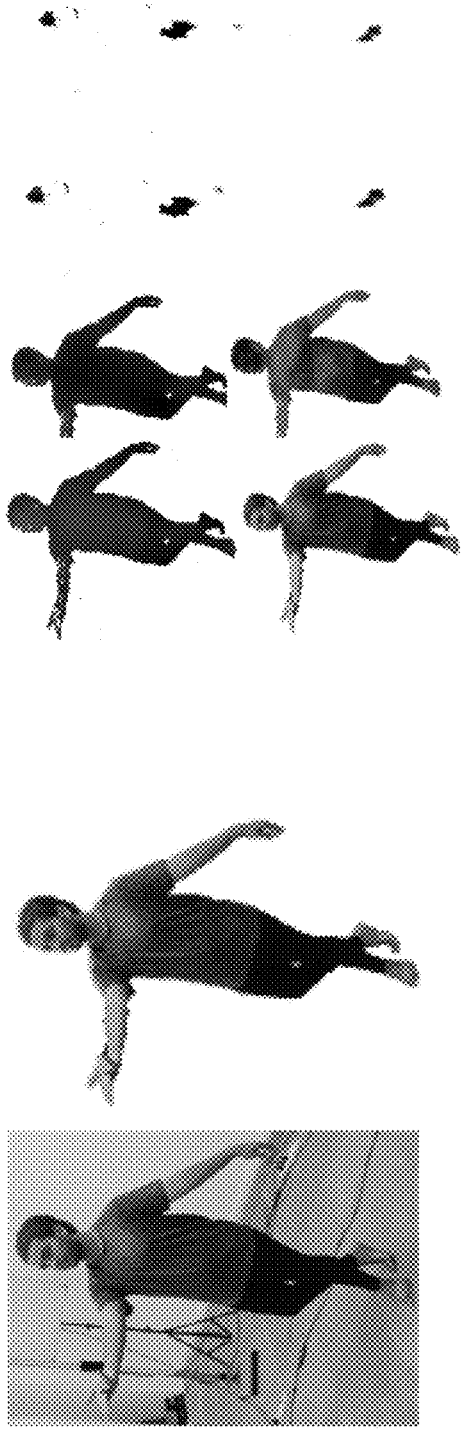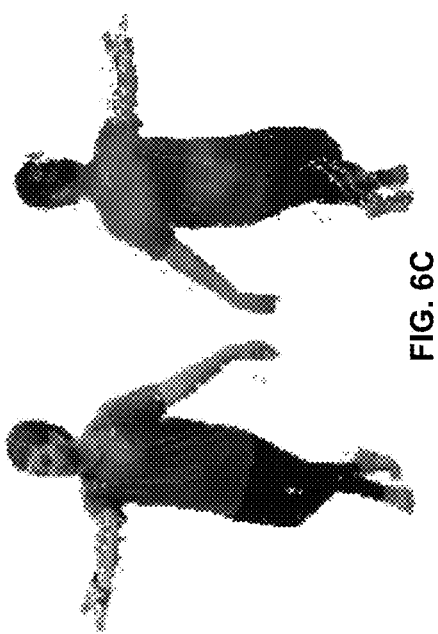
FIG. 6A
FIG. 6B
FIG. 6C

SYSTEM AND METHOD FOR AUTOMATICALLY RECONSTRUCTING 3D MODEL OF AN OBJECT USING MACHINE LEARNING MODEL

CROSS-REFERENCE TO PRIOR-FILED PATENT APPLICATIONS

This application claims priority from the Indian provisional application no. 202041050006 filed on Nov. 17, 2020, which is herein incorporated by reference.

TECHNICAL FIELD

The embodiments herein generally relate to reconstruction of a textured three-dimensional model, and more particularly, to a system and method for reconstructing a three-dimensional (3D) model from a color image using a machine learning model.

DESCRIPTION OF THE RELATED ART

Computer vision (CV) is a field of artificial intelligence (AI) that trains computers to interpret and understand a visual world. Computer vision develops the ability of computers to understand, identify, and classify the objects in the digital images obtained from a camera or video using deep learning. There are several applications of CV, like object detection, image segmentation, etc. Since the field of CV is concerned with developing computational theories and methods for automatic extraction of useful information from digital images, it offers an opportunity to build three-dimensional (3D) models directly from real-world scenes with visual realism and accuracy. But several complications are yet to be resolved in attaining accuracy.

Existing systems reconstruct the 3D model using parametric and non-parametric methods. The existing systems use a parametric representation in the reconstruction of the 3D model, to recover the 3D surface models from an image. The parametric representation may be a skinned multi-person linear model (SMPL). The SMPL model fails to reconstruct finer surface details of clothes that are wrapped on a human body in the image and also cannot reconstruct finer surface details in case of loose clothes present in the image. The existing systems use a non-parametric representation that carries out a volumetric regression. The non-parametric representation is known to be a memory-intensive process as it involves redundant 3D convolution on empty voxels. The memory-intensive process slows down the performance of the system. Further, the existing systems are not completely automated procedures. An inference time for the reconstruction of 3D models is maximum. Also, non-parametric representation sample points in the 3D volume of the image exhaustively. The other existing systems involve multiple angle images with multiple viewpoints capturing by several digital cameras arranged in respective angles such that certain desired viewpoints are captured. The arrangement of several digital cameras and capturing multiple angle images with multiple viewpoints is a tedious process and expensive too.

Therefore, there arises a need to address the aforementioned technical drawbacks in existing technologies to reconstruct a 3D model from a color image.

SUMMARY

In view of foregoing an embodiment herein provides automatically reconstructing a three-dimensional model of an object using a machine learning model. The method includes obtaining, using an image capturing device, a color image of an object. The color image is represented in a three-dimensional (3D) array that includes RGB values of color for each pixel of the color image. The method includes generating, using an encoder, a feature map by converting the color image that is represented in the 3D array to n-dimensional array, the encoder includes one or more convolutional filters. The method includes generating, using the machine learning model, a set of peeled depth maps and a set of RGB maps from the feature map. The method includes determining one or more 3D surface points of the object by back projecting the set of peeled depth maps and the set of RGB maps to 3D space. The set of peeled depth maps represent a 3D shape of the object and the set of RGB maps represent texture and color of the object. The method includes reconstructing, using the machine learning model, a 3D model of the object by performing surface reconstruction using the one or more 3D surface points of the object.

In some embodiments, the set of peeled depth maps and the set of RGB maps are generated by performing ray tracing at a first intersection point with a 3D surface of the object for every pixel in the color image and extending the ray tracing beyond the first intersection point that enables to determine self-occluded parts of the object.

In some embodiments, generating a set of images from the obtained color image to determine the set of peeled depth maps and the set of RGB maps, the set of peeled depth maps and the set of RGB maps are used to estimate a position of each part of the object, the set of images include a relative distance of scenes of the obtained color image, object surfaces from a viewpoint.

In some embodiments, estimating a normal for each point on the set of the peeled depth maps to improve the 3d surface points of the object.

In some embodiments, deriving peeled normal maps using the normal for each point on the set of the peeled depth maps to improve the 3d surface points of the three-dimensional model of the object, the peeled normal maps are computed using horizontal and vertical gradients of the peeled depth maps.

In some embodiments, the one or more surface points of the object include hidden surface points in complex body poses, and viewpoint variations that are used to reconstruct self-occluded parts of the object in the 3d model.

In some embodiments, the method further includes retraining the machine learning model with a loss function if there is a discrimination between at least one of ground truth peeled RGB maps, ground truth peeled depth maps, ground truth peeled normal maps, generated peeled RGB maps, generated peeled depth maps, generated peeled normal maps, respectively.

In some embodiments, the method further includes training the machine learning model using a generative adversarial network (GAN) model that includes (a) a generator that is trained to (i) generate the set of peeled depth maps and the set of RGB maps from the feature map and (ii) generate the 3d model of the object from the plurality of 3d surface points of the object, and (b) a discriminator that is trained to determine discrimination between at least one of the ground truth peeled RGB maps, the ground truth peeled depth maps, the ground truth peeled normal maps, the ground truth surface points, or the ground truth reconstructed 3d model and the generated peeled RGB maps, the generated peeled depth maps, the generated peeled normal maps, the generated surface points, or the reconstructed 3d model respectively.

In some embodiments, the loss function $(L_{peel}) = L_{gan} + \lambda_{depth}L_{depth} + \lambda_{rgb}L_{rgb} + \lambda_{cham}L_{cham} + \lambda_{smooth}L_{smooth}$, wherein, $L_{gan}$=GAN loss, $L_{depth}$=depth loss, $L_{rgb}$=RGB loss, $L_{cham}$=Chamfer loss, $L_{smooth}$=smoothness loss, and $\lambda_{depth}$, $\Delta_{rgb}$, $\Delta_{cham}$, and $\Delta_{smooth}$=weights for depth loss ($L_{depth}$), RGB loss ($L_{rgb}$), Chamfer loss ($L_{cham}$) and smoothness loss ($L_{smooth}$) respectively.

In one aspect, one or more non-transitory computer-readable storage medium storing the one or more sequence of instructions, which when executed by a processor, further causes a method for providing automatically reconstructing a three-dimensional model of an object using a machine learning model. The method includes obtaining, using an image capturing device, a color image of an object. The color image is represented in a three-dimensional (3D) array that comprises RGB values of color for each pixel of the color image. The method includes generating, using an encoder, a feature map by converting the color image that is represented in the 3D array to n-dimensional array, the encoder includes one or more convolutional filters. The method includes generating, using the machine learning model, a set of peeled depth maps and a set of RGB maps from the feature map. The method includes determining one or more 3D surface points of the object by back projecting the set of peeled depth maps and the set of RGB maps to a 3D space. The set of peeled depth maps represent a 3D shape of the object and the set of RGB maps represent texture and color of the object. The method includes reconstructing, using the machine learning model, a 3D model of the object by performing surface reconstruction using the one or more three-dimensional (3d) surface points of the object.

In another aspect, a system for providing automatically reconstructing a three-dimensional model of an object using a machine learning model. The system includes a server that is communicatively coupled with a user device associated with a user. The server includes a memory that stores a set of instructions and a processor that executes the set of instructions and is configured to (i) obtaining, using an image capturing device, a color image of an object, the color image is represented in a three-dimensional (3D) array that includes RGB values of color for each pixel of the color image, (ii) generating, using an encoder, a feature map by converting the color image that is represented in the 3D array to n-dimensional array, the encoder includes one or more convolutional filters, (iii) generating, using the machine learning model, a set of peeled depth maps and a set of RGB maps from the feature map, (iv) determining one or more 3D surface points of the object by back projecting the set of peeled depth maps and the set of RGB maps to a 3D space, the set of peeled depth maps represent a 3D shape of the object and the set of RGB maps represent texture and color of the object, and (v) reconstructing, using the machine learning model, a 3D model of the object by performing surface reconstruction using the one or more 3D surface points of the object.

In some embodiments, the set of peeled depth maps and the set of RGB maps are generated by performing ray tracing at a first intersection point with a 3D surface of the object for every pixel in the color image and extending the ray tracing beyond the first intersection point that enables to determine self-occluded parts of the object.

In some embodiments, generating a set of images from the obtained color image to determine the set of peeled depth maps and the set of RGB maps, the set of peeled depth maps and the set of RGB maps are used to estimate a position of each part of the object, the set of images include a relative distance of scenes of the obtained color image, object surfaces from a viewpoint.

In some embodiments, estimating a normal for each point on the set of the peeled depth maps to improve the 3D surface points of the object.

In some embodiments, deriving peeled normal maps using the normal for each point on the set of the peeled depth maps to improve the 3D surface points of the three-dimensional model of the object, the peeled normal maps are computed using horizontal and vertical gradients of the peeled depth maps.

In some embodiments, the one or more surface points of the object includes hidden surface points in complex body poses, and viewpoint variations that are used to reconstruct self-occluded parts of the object in the 3D model.

In some embodiments, the method further includes retraining the machine learning model with a loss function if there is a discrimination between at least one of ground truth peeled RGB maps, ground truth peeled depth maps, ground truth peeled normal maps, generated peeled RGB maps, generated peeled depth maps, generated peeled normal maps, respectively.

In some embodiments, the method further includes training the machine learning model using a generative adversarial network (GAN) model that includes (a) a generator that is trained to (i) generate the set of peeled depth maps and the set of RGB maps from the feature map and (ii) generate the 3d model of the object from the plurality of 3d surface points of the object, and (b) a discriminator that is trained to determine discrimination between at least one of the ground truth peeled RGB maps, the ground truth peeled depth maps, the ground truth peeled normal maps, the ground truth surface points, or the ground truth reconstructed 3D model and the generated peeled RGB maps, the generated peeled depth maps, the generated peeled normal maps, the generated surface points, or the reconstructed 3D model respectively.

In some embodiments, the loss function $(L_{peel}) = L_{gan} + \lambda_{depth}L_{depth} + \lambda_{rgb}\lambda_{rgb} + \lambda_{cham}L_{cham} + \lambda_{smooth}L_{smooth}$, wherein, $L_{gan}$=GAN loss, $L_{depth}$=depth loss, $L_{rgb}$=RGB loss, $L_{cham}$=Chamfer loss, $L_{smooth}$=smoothness loss, and $\lambda_{depth}$, $\Delta_{rgb}$, $\lambda_{cham}$, and $\Delta_{smooth}$=weights for depth loss ($L_{depth}$), RGB loss ($L_{rgb}$), Chamfer loss ($L_{cham}$) and smoothness loss ($L_{smooth}$) respectively.

The system and method of reconstruction of 3D models using an RGB image have many applications in the entertainment industry, e-commerce, health care, and mobile-based AR/VR platforms. In the health care industry, that too may be widely applicable in physiotherapy from recovering 3D human shape, pose, and texture. The 3D models help the physiotherapists during their education, diagnosis, and even treatment. The 3D modeling of any product in e-commerce conveys the message more effectively to the users. It engages the users efficiently and creates a better awareness of the product. The mobile-based AR/VR platforms help the users to try the product on 3D models. This modeling enhances clarity to the end-user about any product virtually.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 illustrates an exemplary view of a captured color image, a set of peeled depth maps and a set of RGB maps, and a reconstructed 3D model of the object in FIG. 2 according to some embodiments herein;

FIGS. 6A-6C illustrate exemplary views of reconstructed 3D model of the object using wild color image according to some embodiments herein;

DETAILED DESCRIPTION OF THE DRAWINGS

Figure 1:
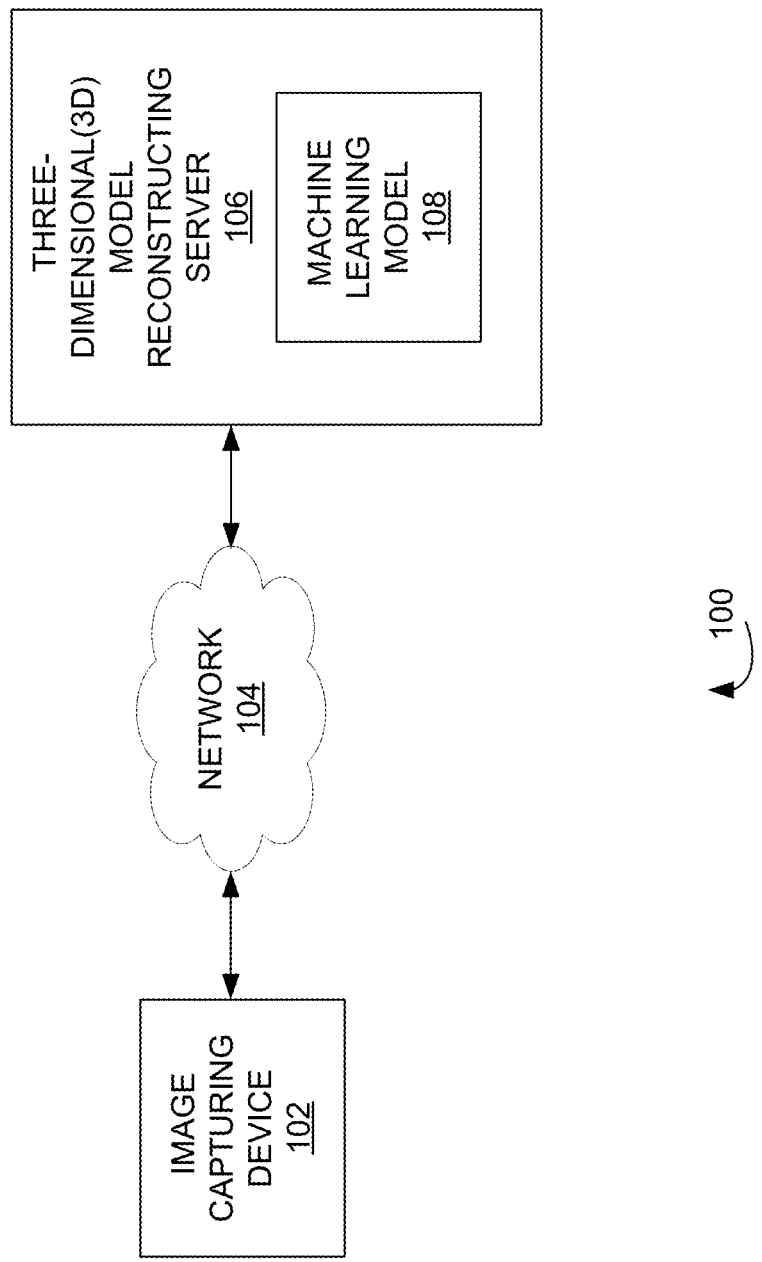
FIG. 1 is a block diagram that illustrates a system for automatically reconstructing a three-dimensional (3D) model of an object using a machine learning model, according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and a method for reconstructing a three-dimensional (3D) model of an object from a color image using a machine learning model. Referring now to the drawings, and more particularly to FIGS. 1 through 8, where similar reference characters denote corresponding features consistently throughout the figures, there are shown preferred embodiments.

FIG. 1 is a block diagram that illustrates a system 100 for reconstructing a three-dimensional (3D) model of an object from a color image, according to some embodiments herein. The system 100 includes an image capturing device 102, and a three-dimensional (3D) model reconstructing server 106. The image capturing device 102 includes a virtual camera that captures a color image of the object. The color image may be a red, green, blue (RGB) image. The object may be a human body or any three dimensional object. The 3D model reconstructing server 106 receives the color image of the object through a network 104. The network 104 is a wireless network or wired network. The network 104 is a combination of a wired network and a wireless network. In some embodiments, network 104 is the Internet. The 3D model reconstructing server 106 without limitation, is selected from a mobile phone, a Personal Digital Assistant (PDA), a tablet, a desktop computer, or a laptop. The 3D model reconstructing server 106 includes a device processor and a non-transitory computer-readable storage medium storing one or more sequences of instructions, which when executed by the device processor causes the reconstruction of a 3D model of the object using a color image. In some embodiments, the image capturing device 102 includes a sensor, maybe a kinect, to obtain corresponding depth and standard RGB values of captured RGB image of the object. In some embodiments, the sensor in the image capturing device 102 converts the obtained color image into a depth image and a 3D image. The image capturing device 102 shares a converted color image to the 3D model reconstructing server 106. The color image is represented in a 3D array that includes RGB values of color for each pixel of the color image. In some embodiments, the image capturing device 102 generates a set of images from the obtained color image to determine a set of peeled depth maps and a set of RGB maps. In some embodiments, the set of images include a relative distance of scenes of the obtained color image, object surfaces from a viewpoint. In some embodiments, the image capturing device 102 estimates each body part position, angles between segments of a pattern of the 3D human skeleton from the received RGB image. The set of peeled depth maps and the set of RGB maps are generated by performing ray tracing at a first intersection point with a 3D surface of the object for every pixel in the color image and extending the ray tracing beyond the first intersection point that enables to determine self-occluded parts of the object.

The 3D model reconstructing server 106 generates a feature map by converting the color image that is represented in the 3D array to n-dimensional array using an encoder. The encoder includes one or more convolutional filters. The convolutional filters are two-dimensional filters. The 3D model reconstructing server 106 generates a set of peeled depth maps and a set of RGB maps from the feature map using the machine learning model 108. The set of peeled depth maps represent a 3D shape of the object and the set of RGB maps represent texture and color of the object. The set of peeled depth maps and the set of RGB maps are used to estimate a position of each part of the object. The 3D model reconstructing server 106 estimates a normal for each point on the set of the peeled depth maps to improve the 3D surface points of the object.

The 3D model reconstructing server 106 determines one or more 3D surface points of the object by back projecting the set of peeled depth maps and the set of RGB maps to a 3D space. The back projection of the set of peeled depth maps and the set of RGB maps in the 3D space represents the texture of the reconstructed 3D shape and color of the object in the obtained color image. The 3D model reconstructing server 106 estimates normal for each point on the peeled depth maps in the reconstruction of the texture of the object in the obtained color image. The 3D model reconstructing server 106 reconstructs the 3D model of the object by performing surface reconstruction using the one or more 3D surface points of the object using the machine learning model 108. In some embodiments, the set of peeled depth maps and the set of RGB maps are used to estimate a position of each part of the object. The 3D model reconstructing server 106 derives peeled normal maps using horizontal and vertical gradients of the peeled depth maps. The 3D model reconstructing server 106 derives peeled normal maps for the peeled depth maps to improve surface details of the 3D model of the object. The improvisation of the surface details of the object may reconstruct hidden points in complex body poses and viewpoint variations. The surface points of the object include hidden surface points in complex body poses, and viewpoint variations that are used to reconstruct self-occluded parts of the object in the 3D model.

The machine learning model 108 is trained using a generative adversarial network (GAN) model. The machine learning model 108 includes (a) a generator that is trained to, (i) generate the set of peeled depth maps and the set of RGB maps from the feature map and (ii) generate the 3d model of the object from the plurality of 3d surface points of the object, and (b) a discriminator that is trained to determine discrimination between at least one of the ground truth peeled RGB maps, the ground truth peeled depth maps, the ground truth peeled normal maps, the ground truth surface points, or the ground truth reconstructed 3d model and the generated peeled RGB maps, the generated peeled depth maps, the generated peeled normal maps, the generated surface points, or the reconstructed 3d model respectively.

The machine learning model 108 is retrained with a loss function if there is a discrimination between at least one of ground truth peeled RGB maps, ground truth peeled depth maps, ground truth peeled normal maps, generated peeled RGB maps, generated peeled depth maps, generated peeled normal maps, respectively.

In some embodiments, the 3D model reconstructing server 106 is trained on 5 subjects with several clothing styles, daily human motion sequences in tight and loose clothing styles. In some embodiments, each object is scaled from four different camera angles that is 0°, 45°, 60°, 90°. In some embodiments, the four peeled depth and texture maps are processed by the 3D model reconstructing server 106 for each frame.

In some embodiments, the 3D model reconstructing server 106 evaluates human actions. In some embodiments, the 3D model reconstructing server 106 recovers the 3D model from previous unseen views. In some embodiments, the 3D model reconstructing server 106 predicts hidden body parts of a human model for severely occluded views. In some embodiments, the 3D model reconstruction reconstructing server 106 introduces a gaussian noise in-depth map and train with RGBD as input. In some embodiments, introducing gaussian noise increase the robustness of the 3D model reconstructing server 106. The 3D model reconstructing server 106 reconstructs the 3D shape, pose, and texture of the object in the obtained RGB image.

Figure 2:
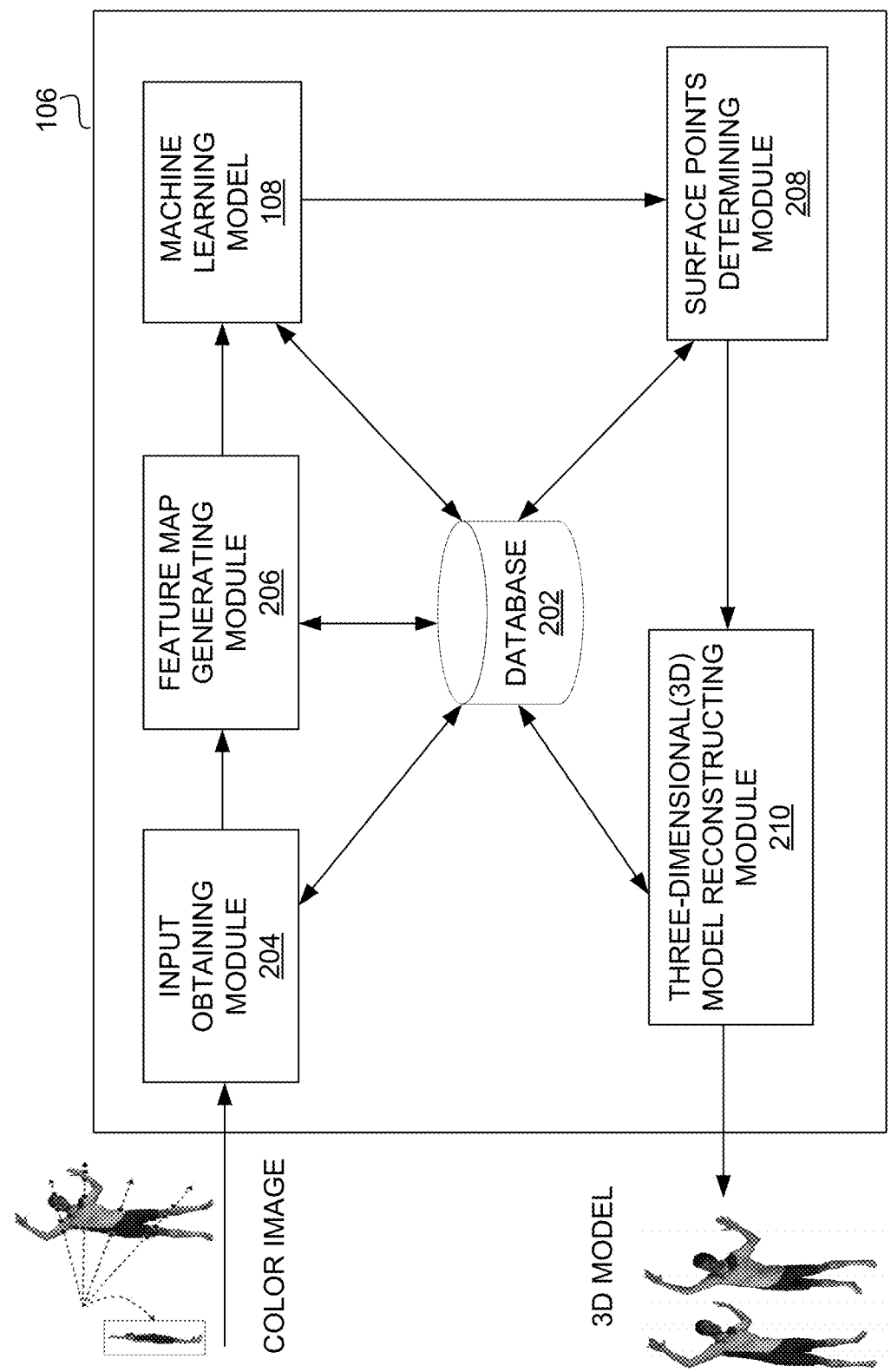
FIG. 2 is a block diagram of a three-dimensional (3D) model reconstructing server of FIG. 1, according to some embodiments herein.

FIG. 2 is a block diagram of a three-dimensional (3D) model reconstructing server 106 of FIG. 1, according to some embodiments herein. The 3D model reconstructing server 106 includes a database 202, an input obtaining module 204, a feature map generating module 206, a machine learning model 108, a surface points determining module 208, and a three-dimensional (3D) model reconstructing module 210. The input obtaining module 204 receives a color image of an object from an image capturing device 102. The database 202 stores the color image of the object. The database 202 is communicatively coupled with the 3D model reconstructing server 106. The feature map generating module 206 generates a feature map by converting the color image that is represented in the 3D array to n-dimensional array using an encoder. The encoder includes one or more convolutional filters. The convolutional filters are two-dimensional filters. In some embodiments, the representation of the color image is performed in n-dimensional arrays.

The machine learning model 108 generates a set of peeled depth maps and a set of RGB maps from the feature map. The set of peeled depth maps and the set of RGB maps are used to estimate a position of each part of the object, the set of images include a relative distance of scenes of the obtained color image, object surfaces from a viewpoint. The machine learning model 108 estimates a normal for each point on the set of the peeled depth maps to improve the 3D surface points of the object.

The surface points determining module 208 determines one or more 3D surface points of the object by back projecting the set of peeled depth maps and the set of RGB maps to a 3D space. The set of peeled depth maps represent a 3D shape of the object and the set of RGB maps represent texture and color of the object. The surface points determining module 208 derives peeled normal maps using the normal for each point on the set of the peeled depth maps to improve the 3D surface points of the three-dimensional model of the object. The peeled normal maps are computed using horizontal and vertical gradients of the peeled depth maps. The surface points of the object include hidden surface points in complex body poses, and viewpoint variations that are used to reconstruct self-occluded parts of the object in the 3d model. The improvisation of the surface points of the object may reconstruct hidden points in complex body poses and viewpoint variations.

The 3D model reconstructing module 210 reconstructs the 3D model of the object by performing surface reconstruction using the one or more 3D surface points of the object.

Figure 3:
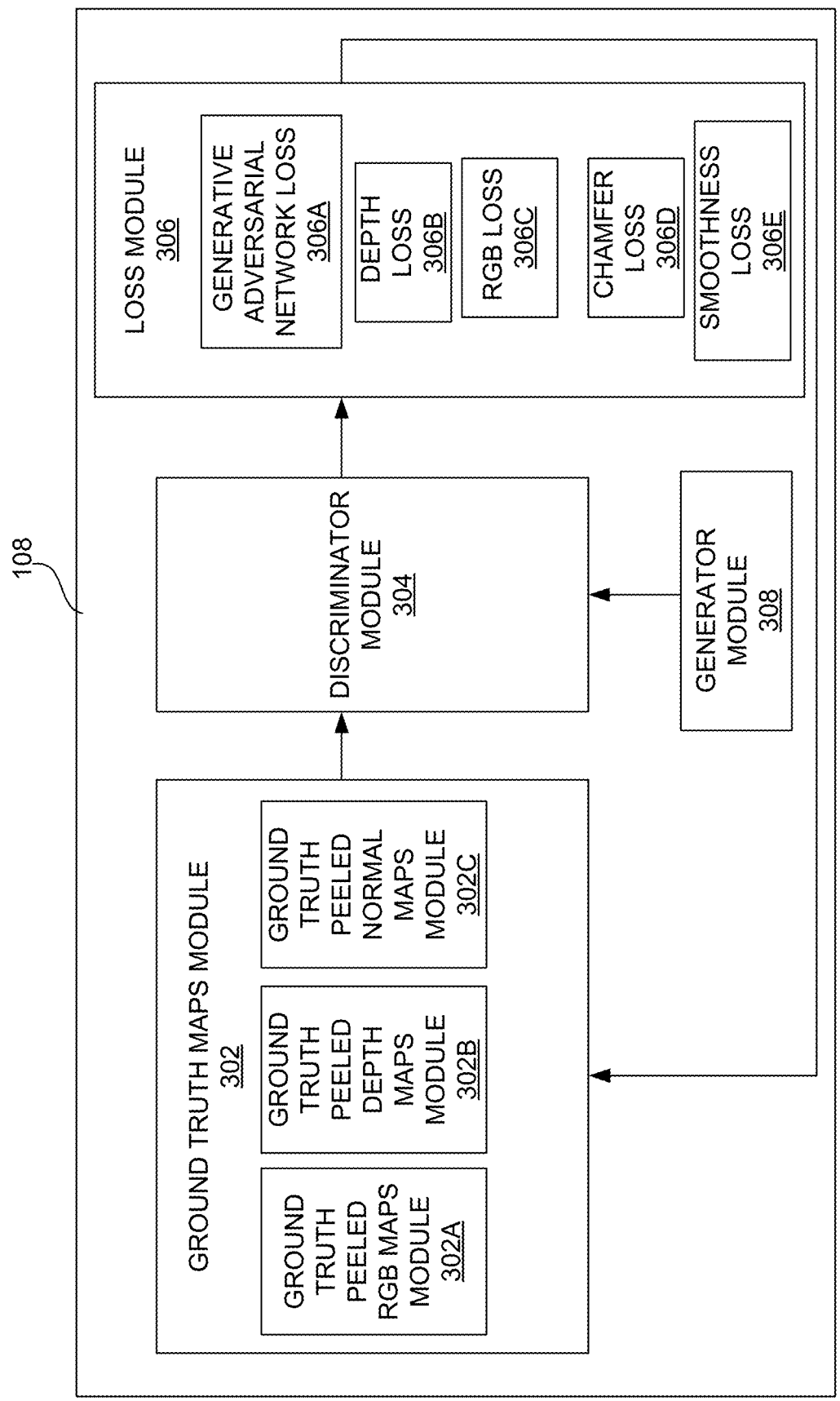
FIG. 3 is a block diagram of a machine learning model of FIG. 1, according to some embodiments herein.

FIG. 3 is a block diagram of a machine learning model 108 of FIG. 1, according to some embodiments herein. The machine learning model 108 includes a ground truth maps module 302, a discriminator module 304, a loss module 306, and a generator module 308. The machine learning model 108 is trained using a generative adversarial network (GAN) model.

The generator module 308 provides generated peeled RGB maps, generated peeled depth maps, generated peeled normal maps, generated 3D model of the object from one or more generated 3D surface points of the object.

The ground truth maps module 302 includes a ground truth peeled RGB maps module 302A, a ground truth peeled depth maps module 302B, and a ground truth normal maps module 302C. The ground truth peeled RGB maps module 302A generates a set of peeled RGB maps. The ground truth peeled depth maps module 302B generates a set of peeled depth maps. The ground truth peeled normal maps module 302C generates a set of peeled normal maps.

The discriminator module 304 discriminates between at least one of the ground truth peeled RGB maps, the ground truth peeled depth maps, the ground truth peeled normal maps, the ground truth surface points, or the ground truth reconstructed 3d model and the generated peeled RGB maps, the generated peeled depth maps, the generated peeled normal maps, the generated surface points, or the reconstructed 3d model respectively. In some embodiments, for example, Markovian discriminator is used.

The loss module 306 includes generative adversarial network (GAN) loss 306A, depth loss 306B, red blue green (RGB) loss 306C, chamfer loss 306D, and smoothness loss 306E. The loss module 306 generates a loss function. The loss function is defined by following equation, $$(L_{peel}) = L_{gan} + \lambda_{depth}L_{depth} + \lambda_{rgb}L_{rgb} + \lambda_{cham}L_{cham} + \lambda_{smooth}L_{smooth}, L_{gan} = \text{GAN loss 306A};$$

$L_{depth}$=depth loss 306B;
$L_{rgb}$=RGB loss 306C;
$L_{cham}$=chamfer loss 306D;
$L_{smooth}$=smoothness loss 306E; and
$\lambda_{depth}$, $\lambda_{rgb}$, $\lambda_{cham}$, and $\lambda_{smooth}$=weights for depth loss ($L_{depth}$) 306B, RGB loss ($L_{rgb}$) 306C, chamfer loss ($L_{cham}$) 306D, and smoothness loss ($L_{smooth}$) 306E respectively. λdep is weight for depth loss and Ldep is loss term for occlusion aware depth loss. Also, λrgb is weight for RGB loss and Lrgb is loss term for RGB loss. λcham is weight for Chamfer loss and Lch is loss term for Chamfer loss. λdCon is weight for depth consistency loss and LdCon is loss term for depth consistency loss. λnormal is weight for normal loss and Lnormal is loss term for normal loss. In some embodiments, the RGB loss Lrgb is the loss between ground-truth RGB images and generated peeled RGB maps. In some embodiments, the GAN model obtains the occlusion-aware depth loss to remove blurry artifacts. The machine learning model 108 is retrained with a loss function if there is a discrimination between at least one of ground truth peeled RGB maps, ground truth peeled depth maps, ground truth peeled normal maps, generated peeled RGB maps, generated peeled depth maps, generated peeled normal maps, respectively. The generative adversarial network loss improves the clarity of the reconstructed 3D model of the object. The chamfer loss helps to predict plausible shapes for occluded parts. The smoothness loss helps to smooth out plausible shapes that are often noisy.

FIG. 4 illustrates an exemplary view 400 of a captured color image, a set of peeled depth maps and a set of RGB maps, and a reconstructed 3D model of the object according to some embodiments herein. The exemplary view 400 depicts a color image that is captured using the image capturing device 102 at 402. The image capturing device 102 includes a virtual camera. In some embodiments, the image capturing device 102 includes a sensor, maybe a kinect, to obtain corresponding depth and standard RGB values of received RGB image of the object. In some embodiments, the sensor in the image capturing device 102 generates a set of images from the obtained color image to determine a set of peeled depth maps and a set of RGB maps. The set of images include a relative distance of scenes of the obtained color image, object surfaces from a viewpoint. The 3D model reconstructing server 106 generates, using the machine learning model 108, the set of peeled depth maps and the set of RGB maps at 404. The set of peeled depth maps and the set of RGB maps are generated at 404 by performing ray tracing at a first intersection point with a 3D surface of the object for every pixel in the color image and extending the ray tracing beyond the first intersection point that enables to determine self-occluded parts of the object.

The image capturing device 102 shares a converted RGB image to the 3D model reconstructing server 106. The set of peeled depth maps and the set of RGB maps are used to estimate a position of each part of the object at 404. The 3D model reconstructing server 106 reconstructs, using the machine learning model 108, a 3D model of the object at 406 by performing surface reconstruction using one or more 3D surface points of the object.

Figure 5C:
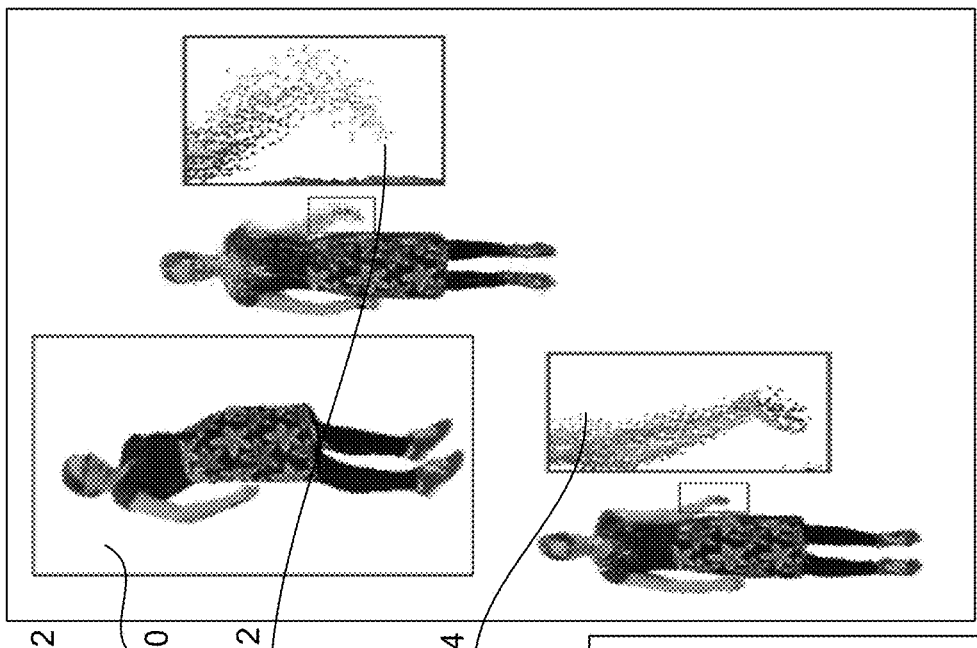
FIG. 5C illustrates an exemplary view of the reconstructed 3D model of the object with and without smoothness loss according to some embodiments herein.
Figure 5A:
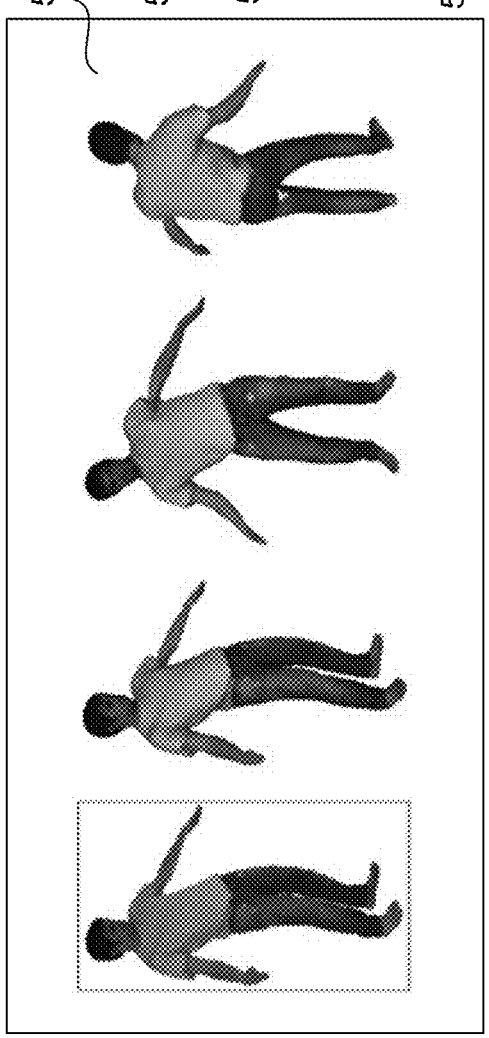
FIG. 5A illustrates exemplary views of the reconstructed 3D model of the object including occluded parts of the object according to some embodiments herein.

FIG. 5A illustrates exemplary views of the reconstructed 3D model of the object including occluded parts of the object according to some embodiments herein. The exemplary view as shown in FIG. 5A includes an input image ad multiple views of reconstructed mesh of the input image at 502. The exemplary view depicts a reconstructed 3D model of human body with occluded parts of the body.

Figure 5B:
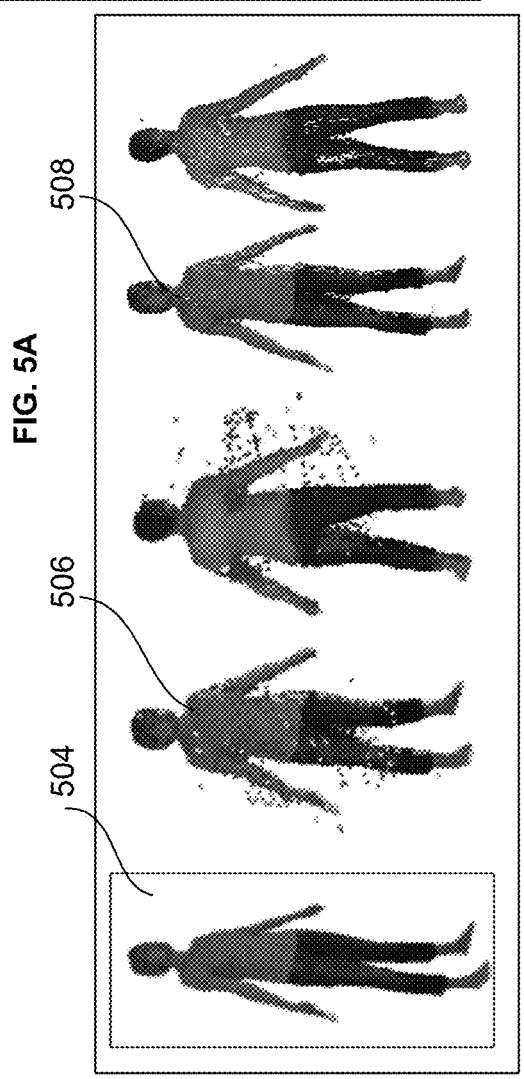
FIG. 5B illustrates an exemplary view of the reconstructed 3D model of the object with and without chamfer loss according to some embodiments herein.

FIG. 5B illustrates an exemplary view of the reconstructed 3D model of the object with and without chamfer loss according to some embodiments herein. The exemplary view includes a color image as input image at 504. The exemplary view includes a reconstructed 3D model of human body in the color image without chamfer loss ($L_{chamfer}$) at 506. The exemplary view includes a reconstructed 3D model of human body in the color image with chamfer loss ($L_{chamfer}$) 508. The absence of chamfer loss produces significant noise in reconstruction. The significant noise attributes independent predictions of depth maps. Thereby, chamfer loss helps to predict plausible shapes for occluded parts.

FIG. 5C illustrates an exemplary view of the reconstructed 3D model of the object with and without smoothness loss according to some embodiments herein. The exemplary view includes a color image as input image at 510. The exemplary view includes a reconstructed 3D model of human body in the color image without smoothness loss ($L_{smooth}$) at 512. The exemplary view includes a reconstructed 3D model of human body in the color image with smoothness loss ($L_{smooth}$) at 514. The smoothness loss helps to produce smoother depth values in different layers. Thereby, smoothness loss helps to smooth out plausible shapes that are often noisy.

FIGS. 6A-6C illustrate exemplary views of reconstructed 3D model of an human in wild color image according to some embodiments herein. FIG. 6A illustrates an exemplary color image of the human. FIG. 6B illustrates an exemplary set of peeled depth maps and exemplary set of RGB maps of the human in the wild color image. FIG. 6C illustrates an exemplary view of the reconstructed 3D model of the human. The reconstructed 3D model includes an improved textured reconstructed 3D model of the human in the wild color image. Thereby enabling the system and method to reconstruct 3D model of the object with wide varieties of shape, pose, texture in color images.

Figure 7:
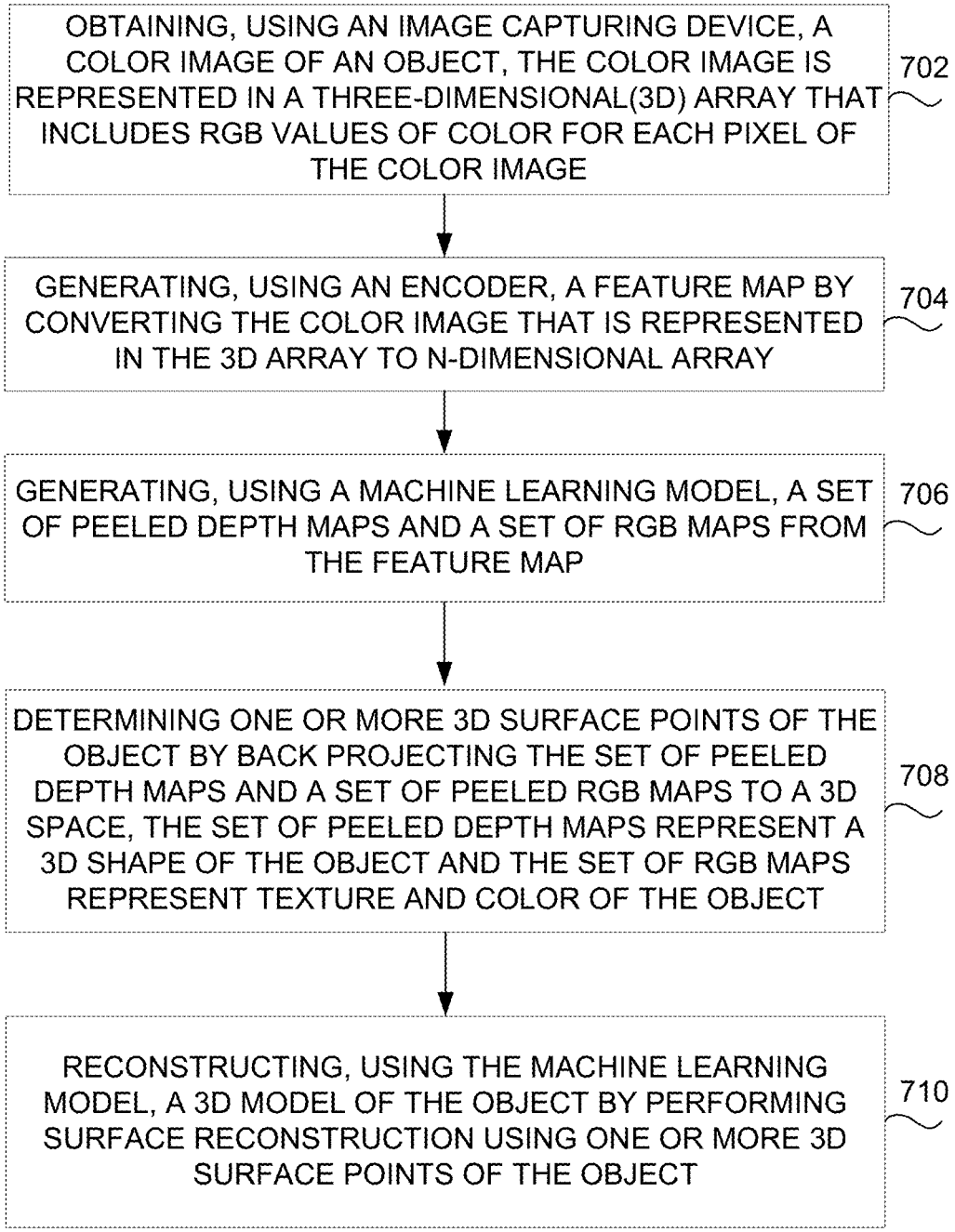
FIG. 7 is a flow diagram that illustrates a method for automatically reconstructing a three-dimensional model (3D) of an object using a machine learning model, according to some embodiments herein.

FIG. 7 is a flow diagram 700 illustrating a method for reconstructing a three-dimensional model of an object using a red green blue image, according to some embodiments herein. At step 702, method 700 includes obtaining, using an image capturing device, color image of an object, the color image is represented in a three-dimensional (3D) array that comprises RGB values of color for each pixel of the color image. At step 704, the method includes, generating, using an encoder, a feature map by converting the color image that is represented in the 3d array to n-dimensional array. In some embodiments, the encoder includes one or more convolutional filters. At 706, the method includes, generating, using the machine learning model, a set of peeled depth maps and a set of RGB maps from the feature map. At 708, the method includes, determining one or more three-dimensional (3d) surface points of the object by back projecting the set of peeled depth maps and the set of RGB maps to a three-dimensional (3d) space. In some embodiments, the set of peeled depth maps represent a three-dimensional (3d) shape of the object and the set of RGB maps represent texture and color of the object. At 710, the method includes, reconstructing, using the machine learning model, a three-dimensional (3d) model of the object by performing surface reconstruction using the one or more three-dimensional (3d) surface points of the object.

Figure 8:
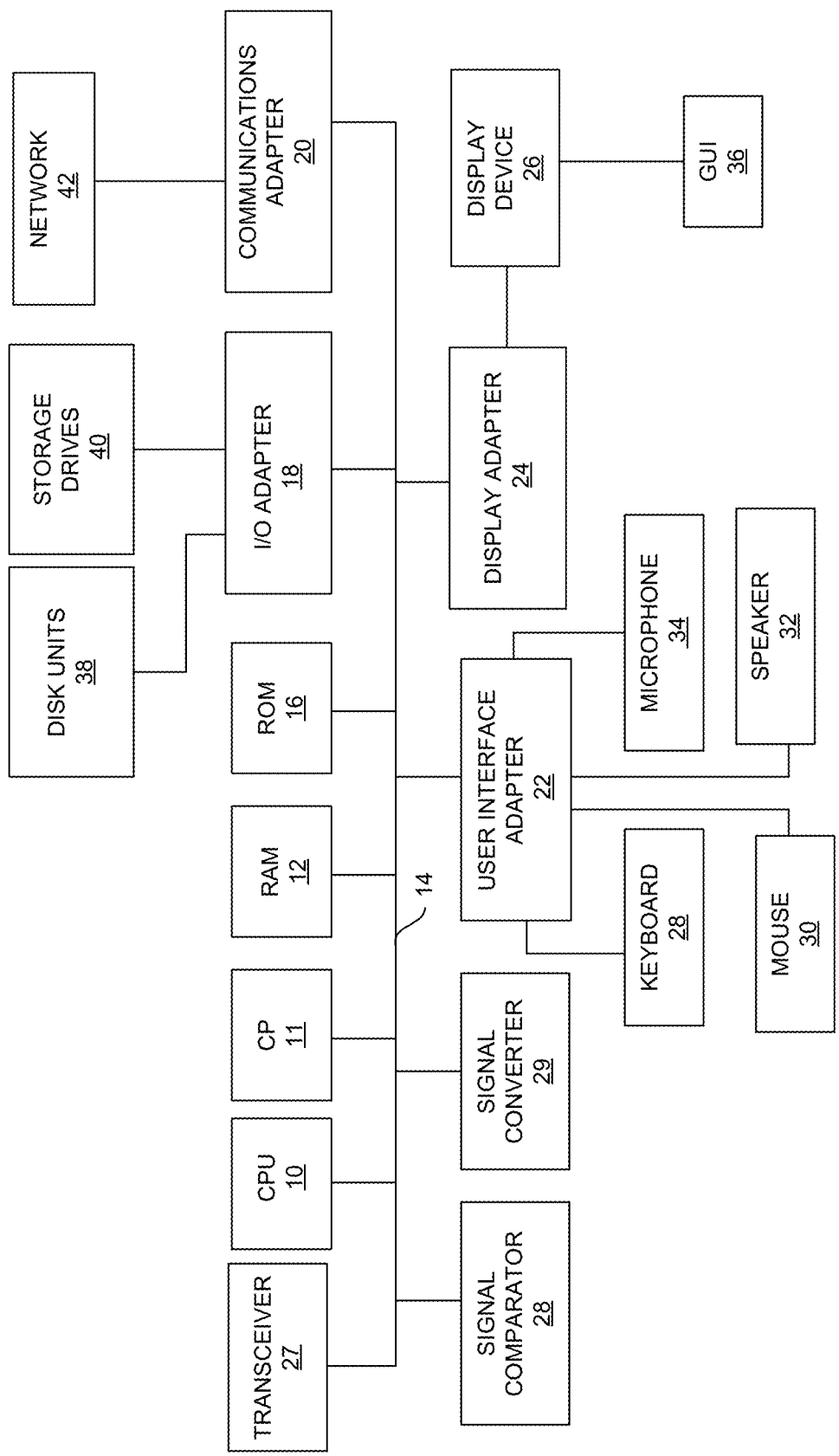
FIG. 8 is a schematic diagram of a computer architecture in accordance with the embodiments herein.

A representative hardware environment for practicing the embodiments herein is depicted in FIG. 8, with reference to FIGS. 1 through 7. This schematic drawing illustrates a hardware configuration of a three-dimensional (3D) model reconstructing server 106/computer system/computing device in accordance with the embodiments herein. The system includes at least one processing device CPU 10 and a cryptographic processor (CP) 11 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and storage drives 40 that are readable by the system. The system can read the inventive instructions on the storage drives 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A processor-implemented method for automatically reconstructing a three-dimensional model of an object using a machine learning model, said method comprising:
    obtaining, using an image capturing device, a color image of an object, wherein the color image is represented in a three-dimensional (3d) array that comprises RGB values of color for each pixel of the color image;
    generating, using an encoder, a feature map by converting the color image that is represented in the 3d array to n-dimensional array, wherein the encoder comprises a plurality of convolutional filters;
    generating, using the machine learning model, a set of peeled depth maps and a set of RGB maps from the feature map;
    determining a plurality of three-dimensional (3d) surface points of the object by back projecting the set of peeled depth maps and the set of RGB maps to a three-dimensional (3d) space, wherein the set of peeled depth maps represent a three-dimensional (3d) shape of the object and the set of RGB maps represent texture and color of the object; and
    reconstructing, using the machine learning model, a three-dimensional (3d) model of the object by performing surface reconstruction using the plurality of three-dimensional (3d) surface points of the object.

2. The method of claim 1, wherein the set of peeled depth maps and the set of RGB maps are generated by performing ray tracing at a first intersection point with a three-dimensional (3d) surface of the object for every pixel in the color image and extending the ray tracing beyond the first intersection point that enables to determine self-occluded parts of the object.

3. The method of claim 1, further comprises generating a set of images from the obtained color image to determine the set of peeled depth maps and the set of RGB maps, wherein the set of peeled depth maps and the set of RGB maps are used to estimate a position of each part of the object, wherein the set of images comprise a relative distance of scenes of the obtained color image, object surfaces from a viewpoint.

4. The method of claim 1, further comprises estimating a normal for each point on the set of the peeled depth maps to improve the 3d surface points of the object.

5. The method of claim 4, further comprises deriving peeled normal maps using the normal for each point on the set of the peeled depth maps to improve the 3d surface points of the three-dimensional model of the object, wherein the peeled normal maps are computed using horizontal and vertical gradients of the peeled depth maps.

6. The method of claim 5, wherein the plurality of surface points of the object comprises hidden surface points in complex body poses, and viewpoint variations that are used to reconstruct self-occluded parts of the object in the 3d model.

7. The method of claim 1, wherein the method further comprises retraining the machine learning model with a loss function if there is a discrimination between at least one of ground truth peeled RGB maps, ground truth peeled depth maps, ground truth peeled normal maps, generated peeled RGB maps, generated peeled depth maps, generated peeled normal maps, respectively.

8. The method of claim 1, wherein the method further comprises training the machine learning model using a generative adversarial network (GAN) model that comprises (a) a generator that is trained to (i) generate the set of peeled depth maps and the set of RGB maps from the feature map and (ii) generate the 3d model of the object from the plurality of 3d surface points of the object, and (b) a discriminator that is trained to determine discrimination between at least one of the ground truth peeled RGB maps, the ground truth peeled depth maps, the ground truth peeled normal maps, the ground truth surface points, or the ground truth reconstructed 3d model and the generated peeled RGB maps, the generated peeled depth maps, the generated peeled normal maps, the generated surface points, or the reconstructed 3d model respectively.

9. The method of claim 7, wherein the loss function $(L_{peel})=L_{gan}+\lambda_{depth}L_{depth}+\lambda_{rgb}L_{rgb}+\lambda_{cham}L_{cham}+\lambda_{smooth}L_{smooth}$, wherein,
    $L_{gan}$=GAN loss;
    $L_{depth}$=depth loss;
    $L_{rgb}$=RGB loss;
    $L_{cham}$=Chamfer loss;
    $L_{smooth}$=smoothness loss; and $\lambda_{depth}$, $\lambda_{rgb}$, $\lambda_{cham}$, and $\lambda_{smooth}$=weights for depth loss ($L_{depth}$), RGB loss ($L_{rgb}$), Chamfer loss ($L_{cham}$) and smoothness loss ($L_{smooth}$) respectively.

10. One or more non-transitory computer-readable storage medium storing the one or more sequence of instructions for automatically reconstructing a three-dimensional model of an object using a machine learning model, which when executed by a processor cause:
   obtaining, using an image capturing device, a color image of an object, wherein the color image is represented in a three-dimensional (3d) array that comprises RGB values of color for each pixel of the color image;
   generating, using an encoder, a feature map by converting the color image that is represented in the 3d array to n-dimensional array, wherein the encoder comprises a plurality of convolutional filters;
   generating, using the machine learning model, a set of peeled depth maps and a set of RGB maps from the feature map;
   determining a plurality of three-dimensional (3d) surface points of the object by back projecting the set of peeled depth maps and the set of RGB maps to a three-dimensional (3d) space, wherein the set of peeled depth maps represent a three-dimensional (3d) shape of the object and the set of RGB maps represent texture and color of the object; and
   reconstructing, using the machine learning model, a three-dimensional (3d) model of the object by performing surface reconstruction using the plurality of three-dimensional (3d) surface points of the object.

11. A system for automatically reconstructing a three-dimensional model of an object using a machine learning model comprising:
   a device processor; and
   a non-transitory computer-readable storage medium storing one or more sequences of instructions, which when executed by the device processor, and is configured to:
   obtain, using an image capturing device, a color image of an object, wherein the color image is represented in a three-dimensional (3d) array that comprises RGB values of color for each pixel of the color image;
   generate, using an encoder, a feature map by converting the color image that is represented in the 3d array to n-dimensional array, wherein the encoder comprises a plurality of convolutional filters;
   generate, using the machine learning model, a set of peeled depth maps and a set of RGB maps from the feature map;
   determine a plurality of three-dimensional (3d) surface points of the object by back projecting the set of peeled depth maps and the set of RGB maps to a three-dimensional (3d) space, wherein the set of peeled depth maps represent a three-dimensional (3d) shape of the object and the set of RGB maps represent texture and color of the object; and
   reconstruct, using the machine learning model, a three-dimensional (3d) model of the object by performing surface reconstruction using the plurality of three-dimensional (3d) surface points of the object.

12. The system of claim 11, wherein the set of peeled depth maps and the set of RGB maps are generated by performing ray tracing at a first intersection point with a three-dimensional (3d) surface of the object for every pixel in the color image and extending the ray tracing beyond the first intersection point that enables to determine the self-occluded parts of the object.

13. The system of claim 11, wherein the processor is further configured to generate a set of images from the obtained color image to determine the set of peeled depth maps and the set of RGB maps, wherein the set of peeled depth maps and the set of RGB maps are used to estimate a position of each part of the object, wherein the strings of images comprise a relative distance of scenes of the obtained color image, object surfaces from a viewpoint.

14. The system of claim 11, wherein the processor is further configured to derive peeled normal maps for the peeled depth maps to improve surface details of the three-dimensional model of the object, wherein the peeled normal maps are computed using horizontal and vertical gradients of the peeled depth maps.

15. The system of claim 11, wherein the plurality of surface points of the object comprises hidden surface points in complex body poses, and viewpoint variations that are used to reconstruct self-occluded parts of the object in the 3d model.

16. The system of claim 11, wherein the processor is further configured to train the machine learning model using a generative adversarial network (GAN) model that comprises (a) a generator that is trained to (i) generate the set of peeled depth maps and the set of RGB maps from the feature map and (ii) generate the 3d model of the object from the plurality of 3d surface points of the object, and (b) a discriminator that is trained to determine discrimination between at least one of a ground truth peeled RGB maps, a ground truth peeled depth maps, a ground truth peeled normal maps, a generated peeled RGB maps, a generated peeled depth maps, a generated peeled normal maps respectively.

17. The system of claim 11, wherein the processor is further configured to retrain the machine learning model with a loss function if there is a discrimination between at least one of ground truth peeled RGB maps, ground truth peeled depth maps, ground truth peeled normal maps, ground truth surface points, and ground truth reconstructed 3d model and generated peeled RGB maps, generated peeled depth maps, generated peeled normal maps, generated surface points, and reconstructed 3d model respectively.

18. The system of claim 11, wherein the processor is further configured to estimate a normal for each point on the set of the peeled depth maps to improve the 3d surface points of the object.

* * * * *